April 20, 1965  JAMES E. WEBB  3,178,883
ADMINISTRATOR OF THE NATIONAL AERONAUTICS
AND SPACE ADMINISTRATION
ATTITUDE CONTROL FOR SPACECRAFT Filed April 20, 1961  2 Sheets-Sheet 1

INVENTORS
Frank F. Batsch
Francis R. Mitchell
John H. Laub
By G. W. O'Brien
Attorney INVENTORS
Frank F. Batsch
Francis R. Mitchell
John H. Laub United States Patent Office 3,178,883
Patented Apr. 20, 1965

3,178,883
ATTITUDE CONTROL FOR SPACECRAFT
James E. Webb, Administrator of the National Aeronautics and Space Administration, with respect to an invention of Frank F. Batsch, John Laub, and Francis R. Mitchell
Filed Apr. 20, 1961, Ser. No. 182,696
3 Claims. (Cl. 60—35.5)

This invention relates to space vehicle attitude controls and included in the objects of this invention are:

First, to provide a space vehicle attitude control which includes a compact jetting device adapted to expel small puffs of air or other gas on command from the space vehicle on which it is mounted or from a remove station, a set of the devices being mounted on the space vehicle and oriented in the three axes of movement, namely, the yaw, roll and spin axes.

Second, to provide a jetting device for space vehicle attitude controls which, on each command, jets an accurate and predetermined quantity of air or gas.

Third, to provide a device for space vehicle attitude control which requires a minimum of electrical energy to effect operation.

Fourth, to provide a device which, while primarily designed for attitude control of spacecraft, may be adapted for use in various environments which require a device responsive to a low energy signal that will trigger a cocked mechanism allowing a predetermined volume of pressurized gas or liquid to be discharged whereupon flow is terminated and the energy in the pressurized gas or liquid is utilized to re-cock the device for a repeated operation on subsequent command.

With the above and other objects in view as may appear hereinafter, reference is directed to the accompanying drawings in which.

Figure 1:
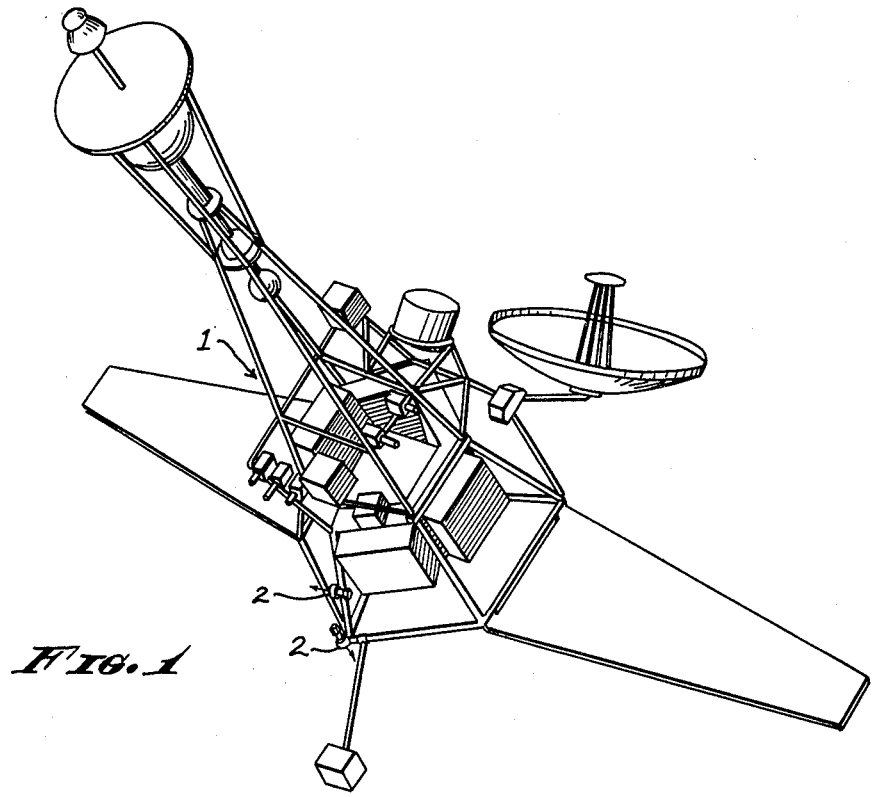
FIGURE 1 is a perspective view of a spacecraft showing two of a set of attitude control units mounted thereon.

The attitude control is intended for installation on a space vehicle such as the type represented in FIG. 1. However, it may be mounted on any type of space vehicle in which it is desired to control attitude. The amount of force required to change the attitude of a space vehicle, even one of substantial size, is quite small. With reference to FIG. 1, a space vehicle 1 is illustrated and two attitude control units 2 are indicated. In practice two attitude control units are utilized to control attitude about each of the three axes of rotation.

Each attitude control unit includes a body 3 having a flange 4 at one end which fits within a cup-shaped cap structure 5. A seal ring 6 is interposed between the outer margin of the flange 4 and a mating shoulder within the cap structure. A screwthreaded retainer ring 7 engages mating threads within the cap structure and bears against the flange 4 to secure the flange 4 in sealing relation with the cap structure 5.

The extremity of the flange 4 and the underlying portion of the cap structure 5 define a cavity 8 which is divided by a spring diaphragm or snap acting diaphragm 9, the periphery of which is clamped between the flange 4 and the cap structure.

The body 3 is provided with a bore 10 in which is fitted a cylindrical filter 11 held in place by a screwthreaded retainer ring 12 which screwthreads into the bore 10 so that the filter is clamped axially within the bore. The filter 11 has a diameter less than the diameter of the bore 10 so as to form therewith an annular entrance cavity 13 which is intersected by a radially extending inlet opening 14. Air or other gas for operation of the attitude control unit is admitted through the inlet opening 14.

The central portion of the diaphragm 9 supports a hub 15 having ports 16 connecting the portions of the cavity 8 on opposite sides of the diaphragm. The hub 15 extends into the bore 10 and filter 11 and terminates in a yoke 17 which receives a head 18 connected by a neck 19 to an armature 20. The armature extends beyond the filter 11 and into a solenoid 21. A spring 22 is interposed between the solenoid 21 and a flange 23 on the armature 20 so that the armature normally occupies an extended position with respect to the solenoid 21.

Extending from the hub 15 into the cap structure 5 is a valve stem 24 terminating in a valve head 25 having opposed sealing faces 26 and 27. The distal sealing face 26 engages a valve seat element 28 which may be in the form of a small O-ring.

The valve seat element 28 is fitted within a recess formed in a valve seat holder disk 29 which bears against the closed end of the cap structure 5. A seal ring 30 interposed between the disk 29 and the closed end of the cap structure 5.

The closed end of the cap structure is provided with an internally screwthreaded bore which receives a retainer ring 31. Clamped between the retainer ring 31 and the disk 29 is a nozzle member 32 having a nozzle bore which is in coaxial relation to, and communicates with, the opening through the valve seat element 28.

Seated on the valve seat holder disk 29 is a bearing ring 33, the periphery of which is engaged by a retainer ring 34 which engages screwthreads within the cap structure 5 and defines a bore continuing from the cavity 8.

Sealingly connected by one axial end to the bearing ring 33 is a corrugated flexible bellows 35. The other extremity of the bellows 35 is sealingly attached to a movable valve seat disk 36 having a bore 37 which loosely receives the stem 24. One end of the disk 36 confronts the sealing face 27 and is provided with a mating valve seat 38.

The end of the retainer ring 34, which defines one wall of the cavity 8, is provided with an internal flange 39 which overlies the movable valve seat disk 36 so as to limit expansion of the bellows 35. However, the bellows are capable of limited contraction which has the effect of moving the valve seat 38 toward the valve seat element 28. Ports 40 are provided in the internal flange 39 so that the annular space between the bellows 35 and the retainer ring 34 is at all times in communication with the cavity 8.

The region within the bellows 35 and between the movable valve seat disk 36 and the valve seat holder disk 29 form a jetting chamber 41 from which air or other gas is jetted through the nozzle member 32.

Operation of the space vehicle attitude control is as follows:

The space vehicle is provided with a set of attitude control units so oriented as to cause rotation of the space vehicle about its three axes of rotation. The control units are spaced from the center of gravity of the space vehicle and arranged so that they discharge externally of the vehicle.

Each attitude control unit is connected to a source of air or gas pressure through its inlet opening 14. Normally, each attitude control unit is in the condition shown in FIGS. 2 and 4, that is, the valve seat 26 engages the valve seat element 28 and the motive fluid fills the cavity 8 on both sides of the diaphragm 9 as well as the jetting chamber 41 and the annular chamber surrounding the bellows 35.

When the solenoid 21 is activated, the armature 20 withdraws the valve head 25 causing the valve face 27 to engage the valve seat 38. The volume of motive fluid within the jetting chamber 41 is ejected through the nozzle member 32.

The air or other gas used as the motive fluid is supplied to the control unit through a suitable pressure regulator so that its pressure is always above that of the pressure outside the control unit. Actually, as the control unit is intended for operation on a space vehicle which operates in an environment approaching absolute zero pressure, virtually the entire contents of the jetting chamber 41 are discharged. As the pressure in the jetting chamber 41 drops, a pressure differential is established across the movable valve seat disk 36 causing the bellows 35 to collapse axially and forcing the valve face 26 against the valve seat element 28, terminating flow from the jetting chamber.

Figure 2:
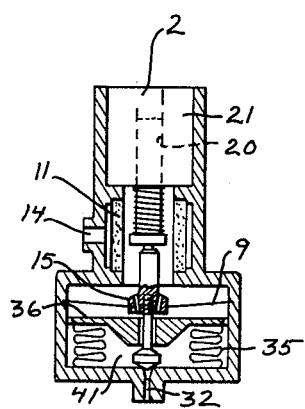
FIGURE 2 is a diagrammatical view in longitudinal section showing an attitude control unit in its closed but ready condition.
Figure 3:
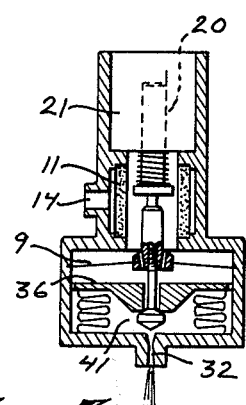
FIGURE 3 is a similar sectional view showing diagrammatically the attitude control unit in operation.
Figure 4:
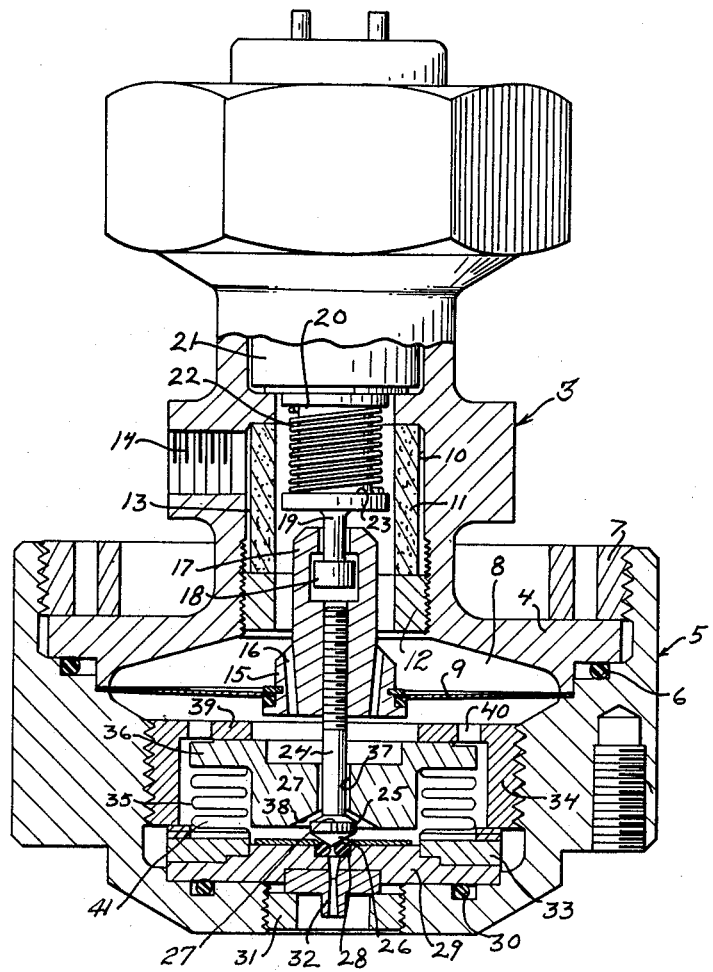
FIGURE 4 is a greatly enlarged longitudinal sectional view of the attitude control unit with the parts in a position corresponding to the diagrammatical view, FIG. 2.

The diaphragm 9 is formed of spring material and when the valve sealing face 26 engages the valve seat element 28, it is depressed slightly below center as shown in FIGS. 2 and 4 so that the force of the diaphragm 9 is in a direction to hold the valve sealing face 26 against the valve seat element 28. When the solenoid 21 is energized, the armature 20 need only pull the diaphragm 9 past center whereupon the diaphragm snaps to its other extreme position, that is, the upper position as viewed in FIG. 3. It will thus be seen that the only energy required of the solenoid 21 is that necessary to snap the diaphragm 9 past center and to overcome the force of the spring 22. The spring 22 need only exert enough force to overcome friction as the force available by reason of the pressure differential across the valve seat disk 36 is more than adequate to move the diaphragm from the position shown in FIG. 3 to the position shown in FIG. 2. The area of the bore in the nozzle member 32 is so small that the effect of pressure differential across the valve seat element 28 may be neglected.

The momentary impulses for operating the solenoid 21 is supplied by energy contained in the space vehicle or generated by apparatus carried by the space vehicle and therefore is limited. Consequently, economy in the operation of the solenoid 21 is of substantial importance. It is, of course, obvious that the signal for operation of the solenoid may be supplied by control apparatus carried by the space vehicle or may be operated by signals received from a remote station.

While the hereinbefore device has been shown as an attitude control device for spacecraft, it should be observed that the device may be utilized wherever it is desired to produce controlled impulses by gas or liquid jets of relatively short duration and of preselected volumes; more particular, whenever it is desired to effect remote control of such impulses.

It will also be observed that by reason of the snap acting diaphragm, very little energy is required to move the diaphragm past center whereupon the pressure of the gas or liquid is utilized not only to expel the predetermined quantity of gas or liquid previously stored within the bellows 35, but to reset or re-cock the spring diaphragm and re-pressurize the region within the bellows 35 so that the device is ready for another cycle of operation.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. An attitude control device for space vehicles, comprising: means defining a supply chamber communicating with a source of pressure gas and a jetting chamber, said means including a movable wall therebetween; an inlet port in said movable wall; a jet orifice outlet port from said jetting chamber disposed in coaxial relation to said inlet port; a valve means disposed between said ports and alternatively engagable therewith; means normally positioning said valve means to close said outlet port and open said inlet port thereby to supply pressure gas to said jetting chamber; and means for operating said valve means to close said inlet port and open said outlet port for discharge of said pressure gas from said jetting chamber through said jet orifice; said movable wall being responsive to pressure difference between said supply chamber and jetting chamber and operable, on discharge of pressure gas from said jetting chamber, to cause said inlet port to urge said valve means into a position closing said outlet port thereby terminating flow from said jetting chamber.

2. An attitude control device for space vehicles, comprising: means defining a supply chamber communicating with a source of pressure gas and a jetting chamber, said means including a movable wall therebetween; an inlet port in said movable wall; a jet orifice outlet port from said jetting chamber disposed in coaxial relation to said inlet port; a valve means disposed between said ports and alternatively engagable therewith; an overcenter yieldable means engageable with said valve means for normally positioning said valve means to close said outlet port thereby to supply pressure gas to said jetting chamber; and momentarily operable means for moving said yieldable means past center thereby to cause said yieldable means to force said valve means to a position closing said inlet port and opening said outlet port for discharge of pressure gas from said jetting chamber through said jet orifice; said movable wall being responsive to pressure difference between said supply chamber and jetting chamber and operable, on discharge of pressure gas from said jetting chamber, to cause said inlet port to urge said valve means into a position closing said outlet port thereby terminating flow from said jetting chamber.

3. Means for producing predetermined jet pulses, comprising: means defining a supply chamber communicating with a source of pressure gas and a jetting chamber, said means including a readily movable wall therebetween; an inlet port to said jetting chamber in said movable wall; a jet orifice outlet port from said jetting chamber disposed in coaxial relation with said inlet port; a valve means disposed between said ports and alternatively engageable therewith; overcenter snap acting means normally positioning said valve means to close said outlet port and open said inlet port thereby to supply a pressure fluid to said jetting chamber; and means operative to move said snap acting means past center thereby to open said outlet port for discharge of said pressure fluid from said jetting chamber through said jet orifice; said movable wall being responsive to a pressure difference between said supply chamber and jetting chamber and operable on discharge of pressure fluid from said jetting chamber to cause said inlet port to urge said snap acting means past center to its initial position and also to urge said valve means into a position closing said inlet port thereby terminating flow from said jetting chamber.

References Cited by the Examiner

UNITED STATES PATENTS

| 2,604,316 | 7/52 | O'Brien et al. | 267—1 |
| 2,959,185 | 11/60 | Deutsch | 137—204 |
| 2,991,027 | 7/61 | Geyling | 244—1 |
| 3,007,493 | 11/61 | Viale et al. | 121—46.5 |
| 3,073,490 | 1/63 | Dahl et al. | 222—504 |

FERGUS S. MIDDLETON, *Primary Examiner.*